3,000,814
PROCESS FOR REFORMING HYDROCARBONS
Charles E. Hemminger, Westfield, Donald D. MacLaren, Scotch Plains, and Albert B. Welty, Jr., Westfield, N.J., assignors to Esso Research and Engineering Company, a corporation of Delaware
Filed July 18, 1955, Ser. No. 522,492
2 Claims. (Cl. 208—140)

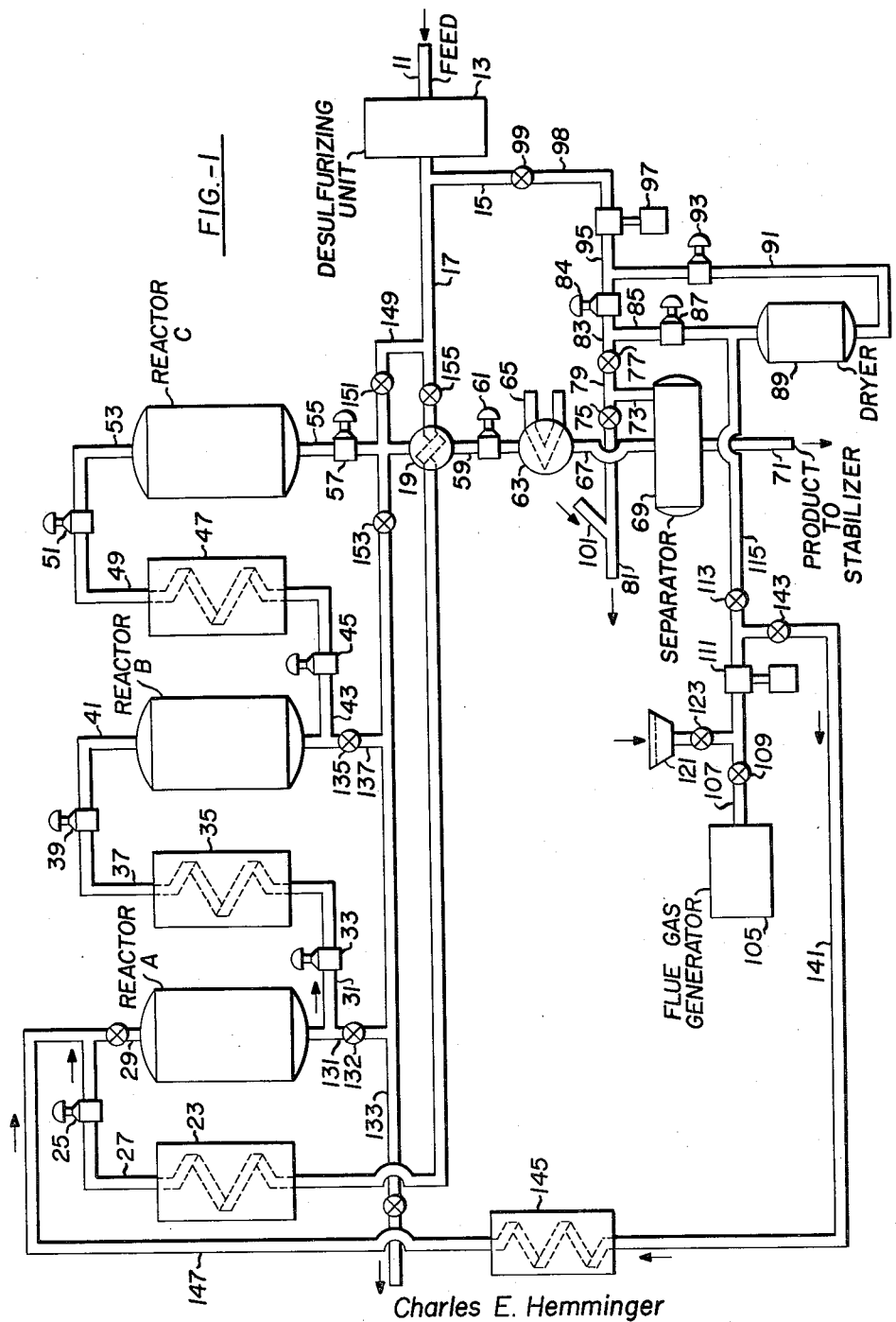

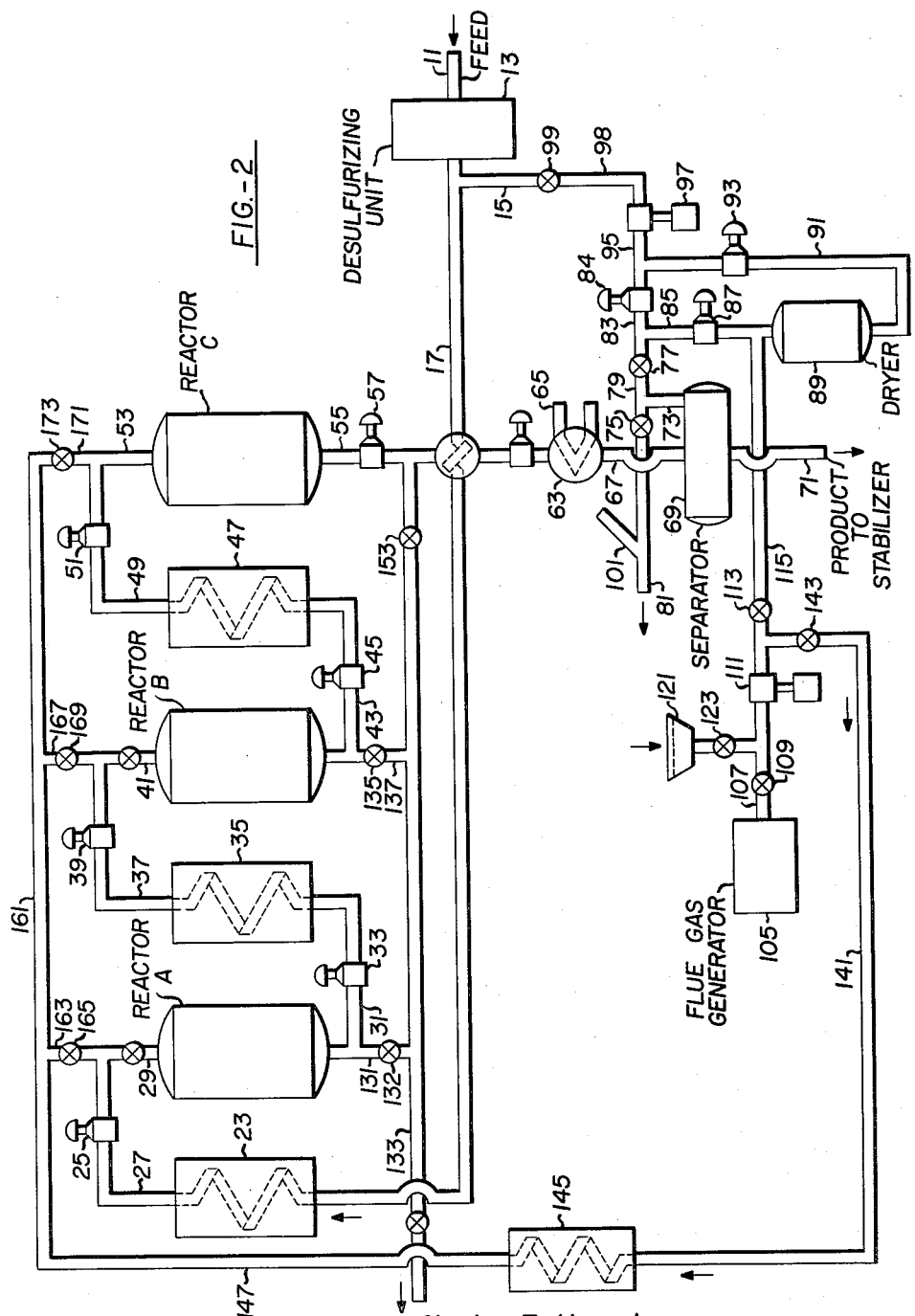

The present invention relates to an improved process for reforming hydrocarbons, especially hydrocarbons of the naphtha boiling range. It relates, more particularly, to a semi-continuous process utilizing a fixed bed, or preferably a plurality of fixed beds, of catalyst with provision for intermittent regeneration and rejuvenation. It deals especially with a catalytic reforming process or system wherein the catalyst inventory can be very materially reduced, for a given capacity, without substantial sacrifice of conversation or of catalyst life. Hence the present invention obviously results in substantial operating economies as compared with processes and systems of the prior art, especially where noble metal catalysts such as platinum or palladium are employed.

Aside from the general feature of overall reduction in catalyst inventory, the present invention involves operation of the system at an initial conversion temperature somewhat higher than conventional. This is coupled with an occasional shutdown or partial shutdown for reactivation or regeneration of catalyst, so that the process may be regarded as a semi-continuous or semi-regenerative reforming process. This is accomplished by interrupting feed and using part of the normal operating equipment, during such interruption, to both regenerate and rejuvenate the catalyst.

Others conducting reforming processes have suggested the use of low catalyst inventories and, of course, the regeneration of catalysts of all types is known in a broad sense. In general, prior art processes have been either essentially non-regenerative, with high catalyst inventory and no substantial regenerating equipment, or fully regenerative, with extensive and costly regenerative equipment. According to the present invention, however, a low catalyst inventory and a very minimum of regenerating equipment are combined with resultant low cost and without loss of efficiency. According to this invention, the oil feed is interrupted at suitable intervals, e.g. 2 to 4 months and replaced by controlled feed of inert gas using much of the same equipment, followed by treatment with diluted air for regeneration and this, in turn, is followed by treatment with a gas richer in oxygen, for rejuvenation. Treating conditions will be explained in greater detail below. The recycle flue gas used to control rejuvenation temperature is suitably dried to prevent chlorine removal from the catalyst with resulting activity loss.

The inert gas purge is preferably followed first by regeneration with dilute air and then with gas containing a larger percentage of oxygen, e.g. normal atmospheric air or other oxygen rich inert gas for catalyst rejuvenation. In one embodiment of the invention, the regenerating and rejuvenating gases are fed through the several reactors in series, the oxygen feed rates and the gas temperatures being controlled to prevent temperature runaway. In this embodiment, the compressors, valves, and gas lines are those used for normal recycling hydrogen, for the most part. In another embodiment, there are lines provided for separate and individual (or parallel) regeneration and rejuvenation of the several reactors. Where corrosion in furnaces is a factor, the latter system has the advantage that oxygen does not pass through the reheating furnaces provided for the recycle gas (containing a major proportion of hydrogen). Where a desulfurized or a low sulfur feed is used, there is usually no substantial danger of corrosion in reactors or furnaces and the first embodiment, which is simpler and requires less investment, is quite satisfactory.

After regeneration has been completed and the carbon on catalyst is substantially fully consumed, the rejuvenation of the catalyst is carried out at a controlled temperature, preferably between about 950° and 1050° F. For this step the recycle gas preheating furnaces may be blocked off and oxygen-containing gas, such as air, which may be somewhat diluted or somewhat enriched, is fed through the reactors at a rapid rate. Means are provided for venting this gas to the flue gas stack so that, again, oxygen does not pass through the preheat furnaces where corrosion is a factor. Provision is made also, in one embodiment, for feeding relatively large volumes of air through the reactors to cool them down in case of "hot spots" due to local carbon deposits. These might otherwise cause runaway temperatures in spots if regeneration is incomplete.

An important object of the invention, as noted above, is to lower catalyst inventory requirements by establishing a shorter cycle of catalyst use between regenerations. Another object is to accomplish this without corresponding loss of conversion or throughput in a given plant. Stated another way, greater conversion of feed to a given octane level can be obtained per expended dollar of investment plus operating costs. As a representative figure, a typical prior art plant having a capacity of about 5000 barrels of naphtha feed per day may require an inventory of about 50,000 pounds of platinum-on-alumina catalyst, costing e.g. $13.00 per pound. With the system of the present invention, the inventory may be cut about in half, with little or no loss in plant service factor over an extended period.

A further object of the present invention is to make available a relatively simple and inexpensive system for converting existing plants so as to reduce very substantially their catalyst requirements without heavy alteration investments and without substantial losses in capacity.

Still another object is the regeneration and rejuvenation of catalyst without catalyst removal from the reactors. This is accomplished with a minimum of auxiliary equipment. Other objects will become apparent as the description proceeds.

Briefly, the process of the present invention uses preferably three or four reactors. The number may be greater or less depending on octane number, plant capacity, feed quality, etc. The first reactor in the series may contain, in one efficient arrangement, substantially less catalyst than the others. It is operated, immediately after filling with fresh catalyst or after rejuvenation, at a temperature about 15° to 30° F. higher than the conventional starting temperature, for continuous operation with platinum-on-alumina catalyst, e.g. at about 925° F. instead of about 900° F. The preferred feed is one low in sulfur and unsaturates, especially one which has been passed through a hydrofining operation, although this is not always essential. It is highly desirable, and for best results it is essential to keep the sulfur content of the feed low. For optimum results, i.e. maximum catalyst life and minimum corrosion, sulfur should be below about 0.002% which is lower than most natural or virgin naphthas. However, sulfur content up to 0.06% on feed may be tolerated under some conditions. A typical operating pressure is around 400 p.s.i.g., but pressure may range from 100 to 500 p.s.i.g. or more. Usually it is not desirable to go much above 400 p.s.i.g.

After an extended period of operation, usually 2 to 6 months in the case of a platinum-on-alumina (or on silica-alumina) catalyst, feed is shut off and the unit is regenerated batch-wise. A fair average time is around 2¼ to 4 months. The reactors are first purged with reactor recycle gas to remove feed and products. This is followed by a purge, preferably with a completely inert gas such as nitrogen, although refinery inert gas may be used, preferably in conjunction with evacuation. Gases containing CO or $CO_2$ should be avoided, or the carbon oxides should be scrubbed out of the purge gas.

After the purging, each reactor is regenerated with air, diluted with nitrogen, e.g. flue gas or other inert at a moderate pressure, typically, atmospheric to 200 p.s.i.g. Here again, the pressure may vary but the level around 100 p.s.i.g. is perferred. The extent to which the regenerative air is diluted depends on the desired maximum temperature during burning; enough flue gas is recycled to dilute the air to about 1-3% in most cases. The diluted air is fed stepwise to each reactor at least until there is incipient oxygen break-through. In most cases this takes about 2 to 8 hours, 3 to 4 hours being about average. The regenerating gas supply, in one embodiment of the invention, may then be promptly cut off so that no appreciable amount of oxygen contacts metal which subsequently will be contacted in the hydrogen-containing gasses. This substantially reduces corrosion in the furnaces.

After regeneration, the reactors are rejuvenated one by one, or in series, or in parallel. Since rejuvenation is carried out at 950° to 1100° F., preferably about 1050° F., the reactors, especially the lead or first in series, must be heated following regeneration. This is accomplished by circulating flue gas containing a low percentage of oxygen through a preheat furnace and then to the reactors. This procedure protects the catalyst against overheating if unburned pockets of carbon exist, e.g. in one of the subsequent reactors. The unit then is depressurized to atmospheric pressure. The furnaces are blocked off by closing suitable valves, and remain blocked off during the rejuvenation. Then air, or a dilute air, preferably containing about 4 to 15% of oxygen by volume, is introduced into each reactor. Rejuvenation is continued for 3-24 hours, preferably about 4-6. After rejuvenation the system is cooled down to reaction temperature by circulating air or inert gas through the entire system. The rejuvenation pressure is preferably between about 50 and 200 p.s.i.g., usually between 100 and 150 p.s.i.g.

After the regenerative and rejuvenative steps, the whole system is purged with an inert gas, such as nitrogen or flue gas. Thereafter, the system can be brought back on stream and it will operate effectively for several months.

As noted above, a lower inventory of catalyst operated at a moderately higher temperature than conventional starting temperature, provides very satisfactory conversion at lower cost. In continuous platinum catalyst reforming, reactor inlet temperatures start around 850° F. to 910° F., about 900° F. being common. As time passes, the catalyst gradually becomes less active and the temperature must be raised to compensate for loss of activity. The top operating limit is around 965° to 975° F., in most cases. With the present invention, it is possible to raise starting inlet temperature to about 920° to 930° F., preferably around 925° F. This higher temperature deactivates the catalyst more rapidly than in continuous operation. Consequently, the catalyst must be reactivated after 2 to 6 months; usually after about 3 or 4 months. These somewhat more frequent interruptions, however, are much less costly than a catalyst inventory of twice the size. Furthermore, the use of infrequent regeneration extends the useful life of the catalyst before it must be replaced. This can amount to more than doubling the life of the catalyst on the basis of barrels of feed per pound of catalyst.

The invention will be more clearly understood upon reference to a detailed description of presently preferred embodiments theerof. Hence, reference will now be had to the attached drawings wherein:

FIG. 1 shows a diagrammatic view of a hydroformer system embodying the present invention.

FIG. 2 shows a similar view of a modified system providing for parallel and/or individual regeneration and rejuvenation of the catalyst.

Referring now to FIG. 1, a suitable feed stock of the naphtha boiling range, preferably a virgin stock free of light ends boiling below about 175° F., is fed in through inlet line 11 at the right. It is preferable to desulfurize this feed by hydrogenation in the desulfurizing unit 13. This is not always required but desulfurization to total sulfur content of about 0.001 to 0.006% by weight is desirable. This unit may be hydrofining unit of known type. In some cases, the feed stock itself may be of fairly low sulfur content and sulfur up to 0.06% may be tolerated in certain instances.

The construction and operation of the desulfurizing unit 13 forms no part of the present invention, nor does the choice of feed stock. It is desirable, under some circumstances, to use a feed containing a proportion of cracked naphtha, either from a catalytic cracking or from a thermal cracking process or both along with the virgin stock. In such cases, hydrofining of the feed is usually required to saturate the olefins present.

The feed, suitably preheated and preferably desulfurized and saturated, as just explained, is mixed with recycle gas containing 60–90 mole percent, or more, of hydrogen supplied from line 15. The feed and recycle gas pass on through line 17 and through a heat exchanger 19 where they are partially heated by the vapor products from reactor C, as will be explained presently.

The partially preheated recycle gas and feed mixture is carried on through line 21 into the first preheat furnace 23. Here the temperature is raised to something above 900° F., preferably about 925° F. as previously explained. A block or cut-off valve 25 in line 27 from the furnace 23 is provided for purposes to be described below, but is open during the reaction cycle. Hence, the preheated feed and recycle gas pass into the top of reactor A through line 29 and contacts the catalyst therein. The catalyst is preferably of the platinum on alumina type although it may be deposited upon an alumina plus silica base, as is well known in the art. The feed stream passes downwardly through the reactor bed and is partially reformed therein. Because of the highly endothermic nature of the dehydrogenation reaction, its temperature drops to a substantial extent and the effluent gases and vapors pass through line 31, through the open block valve 33 and into a second preheat furnace 35. Here again the temperature is raised above 900° F., preferably about 925° F. as before and the reheated vapors and gases pass through line 37 and open block valve 39 to the inlet line 41 of the second stage indicated at reactor B.

In the second stage additional reforming and dehydrogenation takes place and the effluent therefrom passes through line 43 and open block valve 45 into the third preheat furnace 47. Here the products are again preheated and passed through line 49 and open block valve 51 to inlet line 53 of reactor C. In the third stage reactor the reforming and dehydrogenation are normally completed although, as noted above, a 4th reactor stage or a 5th, if desired, may be added for further octane improvement.

The reformed products and the accompanying gases pass downwardly from reactor C through line 55 and open block valve 57 through the heat exchanger 19 previously mentioned. Here a considerable portion of their heat content is given up to the incoming feed and the products are cooled to a substantial degree. The products then pass on through line 59 and open block valve 61 into the condenser 63 which is supplied with a coolant such as water by line 65. The condenser is of conventional construction and needs no detailed description. It is so operated that essentially all of the $C_4+$ gasoline is condensed. The mixture of condensed liquid and gas passes through line 67 to a gas-liquid separator system 69 of conventional construction. From here, the liquid products are taken out through line 71 and the recycle gases are taken out through line 73.

Since there is net production of hydrogen, the recycle or tail gas stream from line 73, may be divided by appropriate adjustment of valves 75 and 77 in line 79. A product tail gas may be taken off through line 81, whereas a portion of the gas to be recycled is taken through line 83 toward the right in FIG. 1.

The recycle gas may be passed through a line 85 and open block valve 87 to a drying system 89 to remove all traces of moisture therefrom. This dryer is usually bypassed during reaction, however, its principal purpose being for drying the regenerating and rejuvenating gases. The dryer 89 may be a bauxite drum or other suitable drying system known to the art. From here, the recycle gas is returned through line 91 and open block valve 93 to line 95 and compressor 97. The latter passes the recycle gas back through line 98, valve 99, and line 15 into the feed line 17, previously mentioned.

The operations above described are the usual operations conducted while the system is on stream. As previously pointed out, the catalyst gradually loses activity and in order to maintain a selected conversion level, it is necessary gradually to increase the initial temperature of the feed to the first reactor and likewise to increase the reheat temperature to each succeeding reactor.

Finally a point is reached where further temperature increase is impractical because of apparatus limitations and, sometimes, because of the effect of temperature on quality and activity of the catalyst. Hence, when the point is reached where it is necessary to have a preheat temperature of about 960–975° F., it becomes necessary to regenerate and rejuvenate the catalyst. A suitable point for such regeneration and rejuvenation is usually reached when the preheat temperature is about 965° F. according to presently preferred operating practice.

Therefore, provision is made in the system for the necessary, but a minimum quantity of auxiliary equipment so that regeneration and rejuvenation may be accomplished using much of the regular operating equipment. In FIG. 1, the feed is cut off from line 11 and the flow of recycle gas from line 15 is continued until the feed is quite thoroughly purged from the system. The next step is to purge out this recycle gas. Preferably a steam ejector line 101 is connected to the tail gas purge line 81 so that the recycle gas may be quite completely purged from the system to a pressure well below atmospheric. When this is accomplished an inert gas is provided to further purge the system.

A flue gas generator 105 is started up, for example by burning natural gas or heavy hydrocarbon oil, and the product flue gas is passed through line 107, valve 109 to a compressor 111. From the compressor this inert gas is passed through open valve 113 and line 115 through the dryer 89, line 91, open valve 93, line 95, compressor (impeller) 97 and lines 98, 15 and 17. Valve 87 of course is closed. The gas passes on through the preheat furnaces and the reactors, in series, to purge all the hydrogen-containing recycle gas from the system through lines 55, 59, 67, 73, valve 75 and line 81. After purging is accomplished, the valve 75 is closed and the inert gas pressure is allowed to build up. The apparatus is designed to build up a pressure of at least 200 p.s.i.g. although operation at about 100 p.s.i.g. appears to be satisfactory for most purposes. When a suitable pressure is reached, the generator 105 is cut off and air is drawn by compressor 111 through an air intake 121 and valve 123 which is opened when valve 109 is closed. A sufficient quantity of air is drawn into the inert gas mixture to provide 0.5 to 3 mole percent of oxygen in the total gas in the system. A preferred oxygen level is around 1 to 2 mole percent. This mixture likewise is passed through dryer 89, lines 91 and 95 and then through lines 15, 17 and heat exchanger 19. The oxygen-containing gas is preheated in furnace 23 and then flows into line 27 from whence it passes through the reactors and the subsequent furnaces as in the case of the gas streams previously described. The oxygen content of this gas must be carefully regulated because, as the gas passes through the catalyst beds, the carbon deposited thereon is burned and runaway temperatures may be encountered without close oxygen control. The oxygen content should be so regulated that the temperature in the reactor beds will not exceed about 1075° F. and an upper limit of about 1060° F. is preferred.

The spent regenerative gases, now partially cooled, pass from the heat exchanger 19 through lines 59 and open block valve 61 and thence out of the system through lines 67, 73 and 81.

The procedure of regenerating varies somewhat depending upon the depth of catalyst bed and the amount of carbon deposited thereon. For a system of moderate size, a typical regenerating time would be about 4 hours per reactor. The operation described above contemplates the gases passing through the reactors in series which is presently preferred. It is also possible, however, to regenerate one reactor at a time or to regenerate them in series. For this purpose, the system shown in FIG. 2 is adaptable as will be described presently. With the system of FIG. 1, the regenerating gas can be passed through only one or two reactors, if desired, e.g. through lines 27 and 29 into reactor A and out through lines 131 and 133 through normally closed valve 153 into line 55. In this case, block valves 33 and 57 are closed and no hot gases need pass through the reheater furnace 35. To regenerate reactors A and B only, valve 45 is closed and valve 135 in an alternate line 137 is opened. From the latter, the regenerating gas passes through line 137 and line 133 through open valve 153 to line 55.

When regeneration is substantially complete, so that there are no substantial deposits of carbon left in the reactors to permit temperature runaway, a richer oxygen stream is passed through the reactors for rejuvenation. For this purpose atmospheric air is drawn in through the intake 121 by compressor 111 and valve 113 is closed. Line 141, provided with valve 143, carries the rejuvenating gas through an air preheater 145 and through line 147 so that the reactors may be rejuvenated either in parallel or in series as desired. Preheater 145 heats the air to a temperature of 750° to 1075° F., preferably around 1000° F. Line 147 connects to line 29 and the various lines 31, 37, 41, 43, 45, 49 and 53 carry the rejuvenating gas stream through the reactors. Rejuvenation restores the catalytic activity of the platinum catalyst by restoring its original lattice spacing in the crystals, according to one theory. According to another theory, rejuvenation removes impurities which have been deposited on the catalyst by oxidizing them. Regardless of the exact reason, passing an oxygen-containing gas through the reactors for several hours, after regeneration is substantially complete at elevated temperatures, is highly beneficial.

In case it is desirable to flow a gas stream in reverse direction through any of the reactors, this can be done by opening a normally locked valve 151 in a line 149 connecting to line 17 and line 133. In this case, a valve 155 in line 17 is closed and valve 153 in line 133 is opened. Suitable vent valves, not shown, are used to release gases from the tops of the reactors.

Referring now to FIG. 2, a system is shown wherein the individual reactors can be regenerated and/or rejuvenated either individually, or in series or in parallel, as desired. The system shown is substantially identical with that of FIG. 1, except for the lines from preheat furnace 145, overhead. Hence FIG. 2 need not be described, except to state that line 147, FIG. 1 and FIG. 2, is continued in line 161 and is connected to line 29 by a T-connection 163 and valve 165; to line 41 by T-connection 167 and valve 169; and to line 53 by connection 171 and valve 173.

With the arrangement described, gas can be passed through either or all of the reactors, singly, in series, or in parallel, as desired.

If desired, the rejuvenating gas can be recycled, bleeding off only a small purge and replacing it with fresh air drawn in through intake 121. In this case, valve 143 is closed, valve 113 is opened, and air goes through line 115 to line 87. Here it may be passed through the dryer 89, or it may be by-passed to line 95 through line 85, and valve 84. Impeller 97 drives it through lines 15, 17, 25, 31, etc., and it returns through lines 55, 59, 67, separator 69, and line 73. Adjustment of valves 75 and 77 determines the recycle ratio. The system, in either figure of drawings, is versatile and flexible.

It will be noted that the system described requires complete blocking off of the feed and complete shutdown and purging for regeneration and rejuvenation. However, the entire regeneration and rejuvenation operation is accomplished within a relatively few hours and the system can be promptly put back on stream. Much of the equipment necessary for the regeneration and rejuvenation is the same as is used for normal operation of the system and the auxiliary requirements are kept to a minimum.

EXAMPLE I

A commercial plant is designed to process 15,000 barrels per day of a naphtha boiling between about 168° and 310° F. This plant is designed to recycle 6000 s.c.f. of hydrogen per barrel of feed and the pressure at the outlet of the last (fourth) reactor is 400 p.s.i.g. The scheme is essentially identical with FIG. 1.

The catalyst employed is of the alcoholate (eta) alumina base type carrying 0.6% by weight of platinum. Catalysts of lower platinum content can be used. Silica-alumina base catalyst can be used but is somewhat less active. This plant operates at 925° F. inlet temperature (to all three reactors) when the catalyst is fresh. Gradually, through an operating period of 3 months, the operating (inlet) temperature of the feed must be increased to a maximum of 965° F.

The normal feed is 90% of Redwater naphtha, boiling at 158° to 310° F. and plus 10% of coker naphtha, of boiling range between 168° and 325° F. The plant is designed, however, to convert either naphthenic feed or paraffinic feed to motor fuel of 95 octane number, Research clear. With 3 cc. of tetra-ethyl lead added, either product shows a Research octane number of approximately 100, at a space velocity feed rate of 1.28 w./hr./w., based on total catalyst inventory in the three reactors.

The feed stocks have the following characteristics:

*Table I*
FEED CHARACTERISTICS

|  | Naphthenic | Paraffinic |
|---|---|---|
| API gravity | 57.4 | 59.0 |
| Characterization factor K [1] | 11.82 | 11.90 |
| Adjusted factor K | 11.91 | 11.99 |
| Mean Av. B.P., °F | 234° | |
| 10% point | 214° | |
| 50% point | 248° | |
| 90% point | 292° | |
| Octane No., CFRR+O | 60.8 | 51.4 |
| Hydrocarbon type analysis, percent: | | |
| Naphthenes | 50 | 35 |
| Paraffins | 42 | 62 |
| Aromatics | 8 | 3 |
| Product Octane No. Research, Clear | 95 | 95 |
| Yield, vol. percent of feed | 79.0 | 76.5 |

[1] K is calculated by dividing cube root of mean boiling point, degrees Rankine, by specific gravity of the feed. The adjusted factor allows for spread of various components.

After shutting off the feed, the system is first purged by continuing recycle gas flow until feed hydrocarbons are cleared out. Then, by steam ejection at line 101, the hydrogen is taken out. A purge gas, obtained by removing CO and $CO_2$ from flue gas by scrubbing with caustic or other appropriate material, is used to further clear the hydrogen from the system. It may be used without steam ejection if desired.

Next a stream of air, diluted with flue gas to an oxygen content of 1 to 2 mole percent, is passed through at elevated temperature (at least 700° F.). It is so regulated that maximum temperature does not exceed 1050° F. This is continued for a period of 4 to 8 hours (or longer at lower temperature) until no further CO or $CO_2$ comes off the catalyst. At this point, the temperature of the effluent regenerating gas drops to 700° F. or so. The furnaces 23, etc., may be used to keep the temperature up around 1000° F. or so for more rapid regeneration.

After the carbon on catalyst has been consumed, the recycle gas compressor 97 is shut off and the system is purged with air from intake 121, compressor 111, line 141 and preheater 145. The air is heated to a temperature between 850° and 1100° F., preferably about 1000° F. With ordinary air, at 1000° F., rejuvenation is carried out for about 4 hours. With diluted air the time required is longer, e.g. with a gas containing only 8 mole percent oxygen, at 1000° F., 32 hours is required for rejuvenation. Longer times are required also for lower air temperatures.

It will be obvious that several variations may be made in the system described and that it may be operated in series, or in parallel, for either regeneration or rejuvenation, or both.

What is claimed is:

1. A semi-regenerative process for improving the octane rating of hydrocarbons of the naphtha boiling range by hydroforming them to levels of about 95 Research octane number, which comprises, in combination, the steps of desulfurizing said hydrocarbons to a sulfur content not substantially greater than 0.002% by weight, preheating the desulphurized naphtha feed and a stream of hydrogen-containing gas so that the feed and gas together attain an inlet temperature of at least 910° F., passing the feed and gas at a pressure of about 400 p.s.i.g. over a first stage catalyst consisting primarily of platinum supported on an alumina, to cause some conversion and endothermic reaction, reheating the effluent from the first stage catalyst to the same inlet temperature and passing it over at least an additional stage of similar catalyst, whereby the catalyst gradually accumulates carbon and loses activity in all stages, gradually raising the inlet temperature of the feed and gas to compensate for such loss of activity until an inlet temperature of about 960° to 975° F. has been reached, then cutting off the feed, purging with the first-mentioned gas, cutting off the first-mentioned gas, purging with an inert gas substantially free of carbon oxides, feeding a gas containing 1 to 2 mole percent of oxygen through said catalyst stages in series until said carbon is substantially removed from the catalyst, then feeding dry gas containing 5 to 20 mole percent of oxygen and preheated to 850 to 1100° F. through said catalyst stages in series for an extended period to rejuvenate said catalyst and substantially improve its activity, and recycling rejuvenation effluent gas through a drier back to the reactors.

2. Process according to claim 1 wherein the rejuvenation temperature is about 1000° F.

References Cited in the file of this patent

UNITED STATES PATENTS

| 2,654,694 | Berger et al. | Oct. 6, 1953 |
| 2,662,861 | Riblett et al. | Dec. 15, 1953 |
| 2,664,404 | Blatz et al. | Dec. 29, 1953 |